United States Patent [19]
Fox

[11] Patent Number: 5,392,089
[45] Date of Patent: Feb. 21, 1995

[54] CAMERA WITH PORTRAIT MODE

[75] Inventor: Myron E. Fox, Spencerport, N.Y.

[73] Assignee: Eastman Kodak Company, Rochester, N.Y.

[21] Appl. No.: 155,611

[22] Filed: Nov. 18, 1993

[51] Int. Cl.⁶ .............................................. G03B 7/00
[52] U.S. Cl. .................................................. 354/412
[58] Field of Search .................. 354/400, 415, 195.1, 354/195.12, 149.1, 149.11, 412, 413, 446–455

[56] References Cited

U.S. PATENT DOCUMENTS

| | | | |
|---|---|---|---|
| 4,788,603 | 11/1988 | Fujimura et al. | 358/342 |
| 4,998,126 | 3/1991 | Kazami | 354/400 |
| 5,198,855 | 3/1993 | Iwai | 354/415 |
| 5,220,375 | 6/1993 | Ishida et al. | 354/419 |
| 5,223,884 | 6/1993 | Katoh et al. | 354/402 |
| 5,227,831 | 7/1993 | Miyazaki et al. | 354/402 |

*Primary Examiner*—David M. Gray
*Attorney, Agent, or Firm*—David A. Howley

[57] ABSTRACT

A camera includes a taking lens and a variable aperture diaphragm adjustable to provide a relatively large aperture for effecting a relatively shallow depth of field of the taking lens and a smaller aperture for effecting a less shallow depth of field of the taking lens. Also included are manually operated means for selecting a portrait mode when taking a picture of a person and means for adjusting the diaphragm to provide the smaller aperture when the portrait mode is selected, whereby the less shallow depth of field of the taking lens is used to take a picture of a person in the portrait mode.

7 Claims, 9 Drawing Sheets

CAMERA WITH PORTRAIT MODE

FIELD OF THE INVENTION

The present invention relates generally to the field of photography, and, more particularly, to a camera having a portrait mode.

BACKGROUND OF THE INVENTION

Present day cameras offer camera users a variety of modes in which to record images. Examples of these modes are fill flash mode, self-timer mode, portrait mode and double-exposure mode.

The Olympus IS-3 DLX Camera has a portrait mode used to record the image of one or more persons. In the portrait mode, the widest aperture is used to obtain a shallow depth of field. Additionally, an auto-zooming function is actuated when the camera is set to the portrait mode. The auto-zooming function utilizes information, including the camera subject distance obtained from a range-finder, to move a zoom lens to a position deemed desirable for taking a portrait picture. Further, there is no indication that the camera's flash is automatically fired during portrait mode picture taking.

PROBLEMS TO BE SOLVED BY THE INVENTION

By utilizing the widest aperture when set to the portrait mode, the Olympus IS-3 DLX Camera obtains a relatively shallow depth of field. Having a shallow depth of field requires extremely precise focusing to insure that the subject to be photographed is in focus, especially at the short focus distances typically used in portrait photography. If the camera is not precisely focused on the subject, the subject will be out of focus in the recorded image, thereby degrading image quality.

In addition, there is no indication that the Olympus IS-3 DLX Camera's flash is automatically fired during portrait mode picture taking. It may be desirable to fire the flash, even in bright, sunlit conditions, in order to avoid harsh facial shadows on the subject to be photographed. A camera operator can forget to select flash picture taking when in the portrait mode, resulting in harsh facial shadows which degrade image quality.

Further, the Olympus IS-3 DLX Camera utilizes an auto-zooming function when in the portrait mode. However, having an auto-zooming function in a camera increases the complexity and cost of the camera.

SUMMARY OF THE INVENTION

According to one aspect of the invention, a camera includes a taking lens and a variable aperture diaphragm adjustable to provide a relatively large aperture for effecting a relatively shallow depth of field of the taking lens and a smaller aperture for effecting a less shallow depth of field of the taking lens. Also included are manually operated means for selecting a portrait mode when taking a picture of a person and means for adjusting the diaphragm to provide the smaller aperture when the portrait mode is selected, whereby the less shallow depth of field of the taking lens is used to take a picture of a person in the portrait mode.

According to another aspect of the invention, the camera includes means for emitting light to illuminate the person during photographing, the light emitting means being operated to emit light every time a picture of a person is taken in the portrait mode.

According to yet another aspect of the invention, the taking lens includes a zoom lens system moveable between a relatively short focal length and one or more longer focal lengths. The zoom lens system is moved to the same longer focal length every time a picture of a person is taken in the portrait mode.

ADVANTAGEOUS EFFECTS OF THE INVENTION

By adjusting the diaphragm to a smaller aperture when in the portrait mode, a less shallow depth of field is obtained than would be available at the larger aperture. Having a less shallow depth of field increases the likelihood that the subject to be photographed will be in focus, especially at the short focus distances often used in portrait photography.

In addition, by operating the light emitting means to emit light every time a picture of a person is taken in the portrait mode, harsh facial shadows, which could result from not illuminating the person, are avoided. As a result image quality is enhanced. Also, the operator does not need to remember to select flash picture taking when in the portrait mode. Consequently, the camera is more user friendly.

Further, by moving the zoom lens system to the same longer focal length every time a picture of a person is taken in the portrait mode, rather than auto-zooming the zoom lens system, the operation of the camera is greatly simplified. As a result, the cost of the camera is substantially reduced.

DETAILED DESCRIPTION OF THE INVENTION

The invention is disclosed as being embodied preferably in a zoom lens camera. Because the features of a zoom lens camera are generally known, the description which follows is directed in particular only to those elements forming part of or cooperating directly with the disclosed embodiment. It is to be understood, however, that other elements may take various forms known to a person of ordinary skill in the art.

Figure 1:
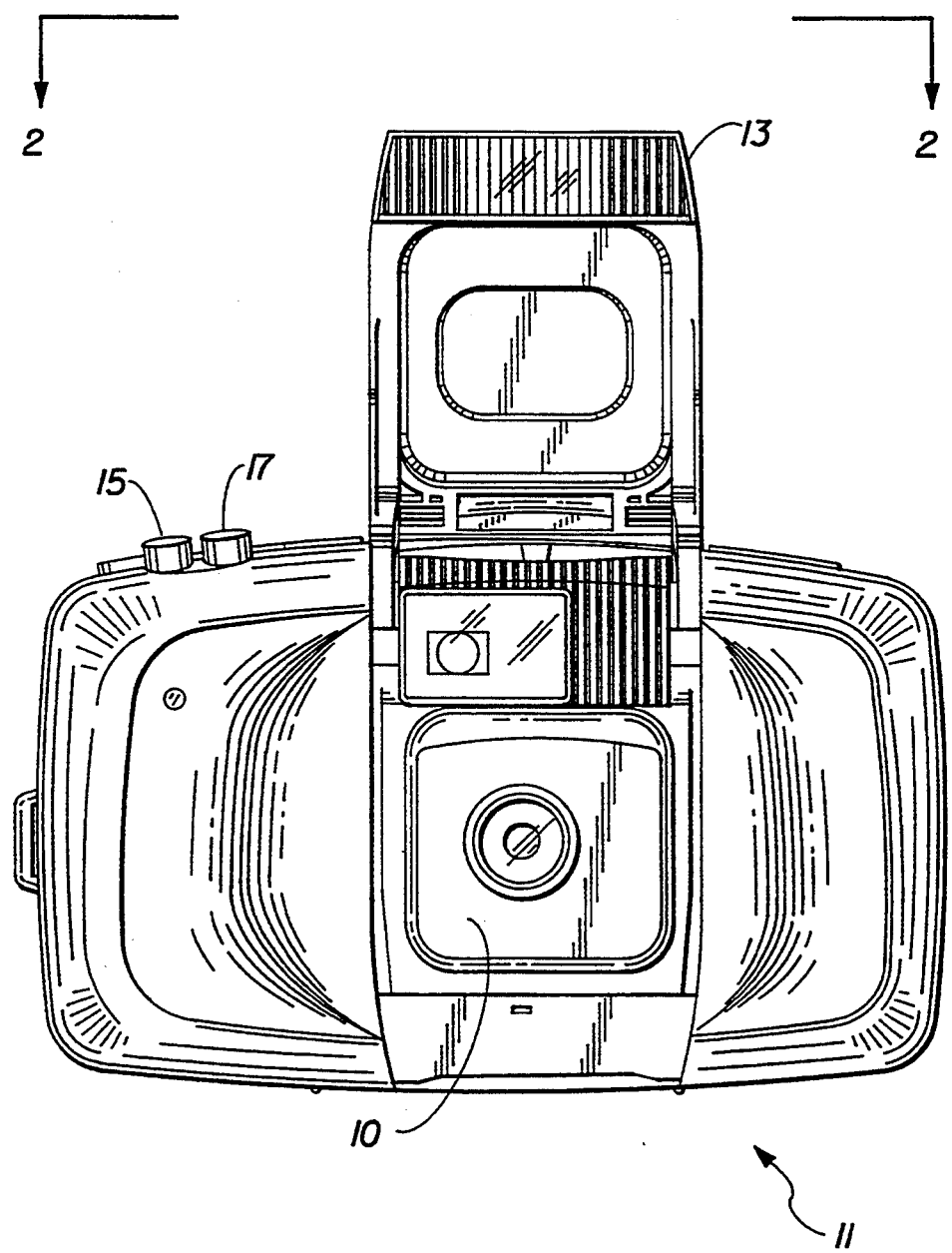
FIG. 1 is a front view representing a camera with a cobra flash located in an open position.

Turning now to FIG. 1, a camera, designated generally by the reference numeral 11, includes a cobra flash 13 shown in an open position. The camera includes a taking lens, in the form of a zoom lens 10, and a pair of buttons 15, 17 used to move the zoom lens between a telephoto position and a wide-angle position.

Figure 2:
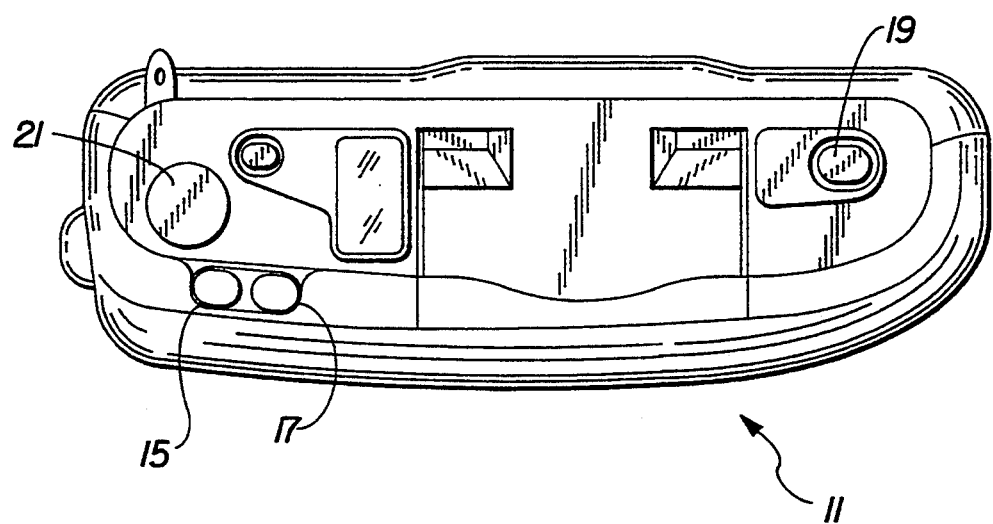
FIG. 2 is a top view of the camera of FIG. 1, taken along line 2, with the cobra flash located in a closed position.

With reference to FIG. 2, the cobra flash is shown in a closed position. A portrait mode button 19 is used to select a portrait mode, the detailed operation of which will be described infra. A shutter release button 21 actuates the camera to expose a photosensitive material in the camera, such as photographic film, to light reflected from a subject to be photographed.

Figure 3:
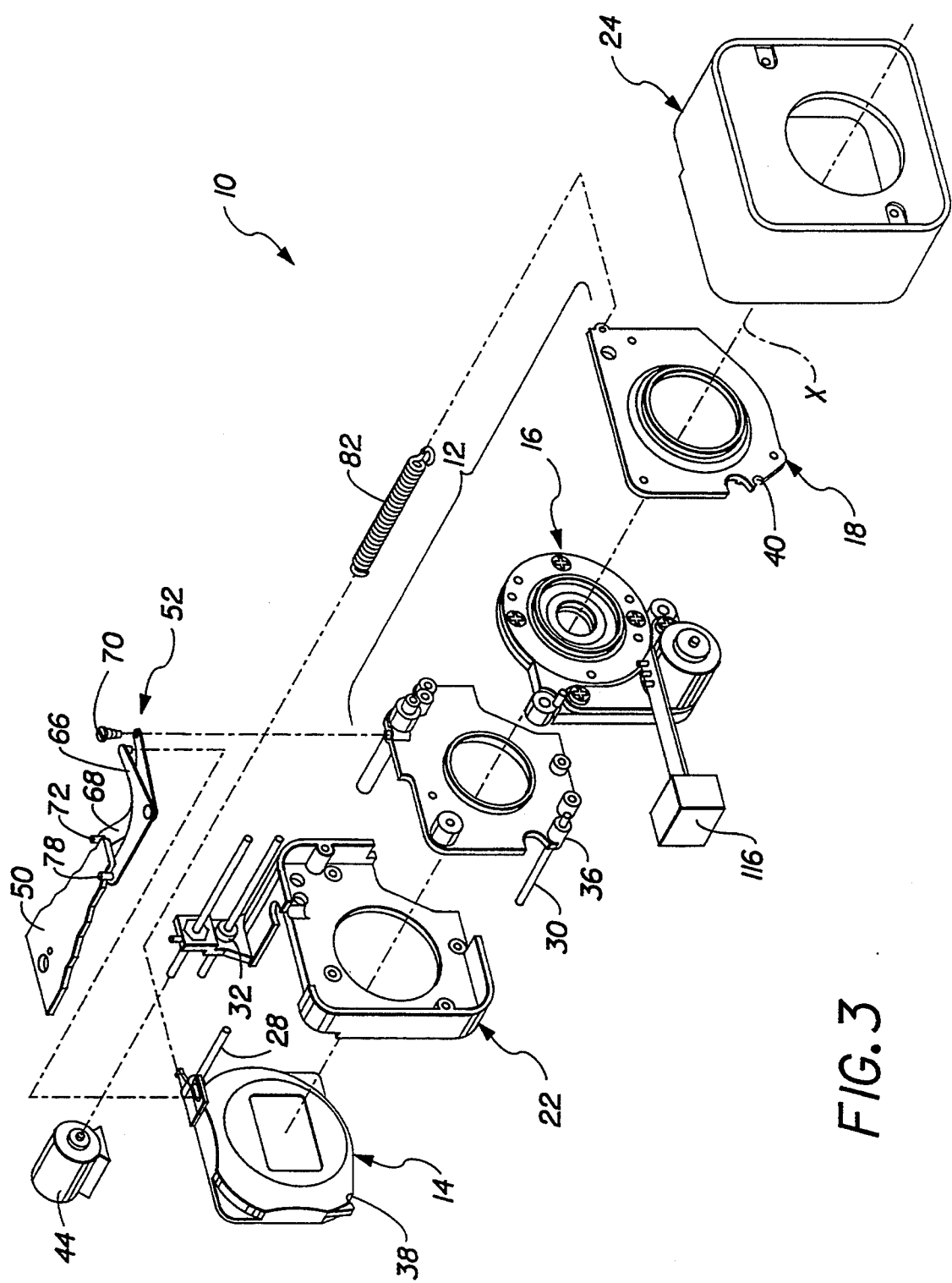
FIG. 3 is an exploded view of a zoom lens system incorporated in the camera of FIG. 1.
Figure 4:
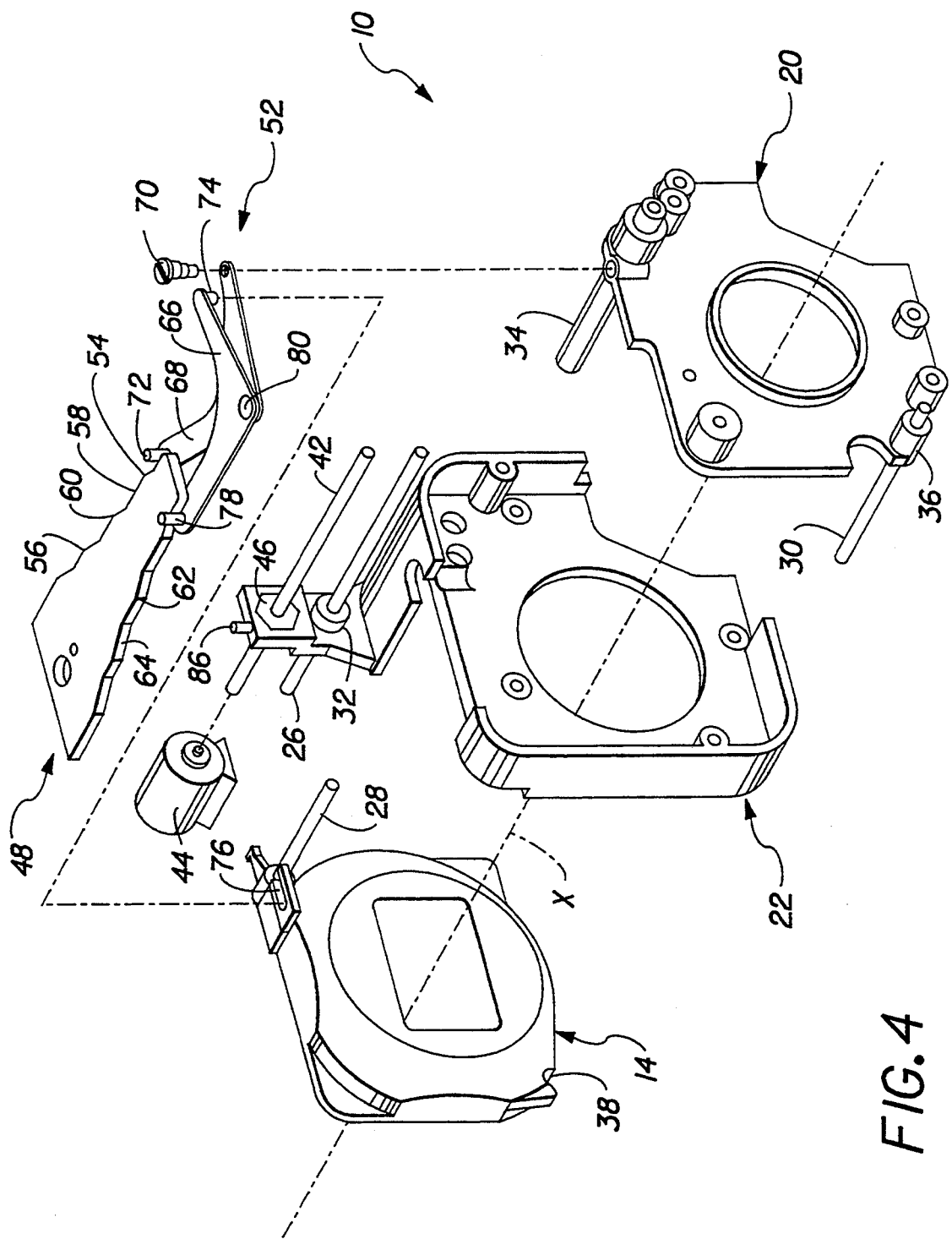
FIG. 4 is an enlarged view of a portion of the zoom lens system of FIG. 3.

Referring now to FIGS. 3 and 4, zoom lens 10 is depicted including first or front and second or back lens groups 12 and 14, respectively, disposed for relative movement along an optical axis X. The front lens group 12 includes a diaphragm/shutter mechanism 16, a front lens retainer 18 and a rear lens retainer 20, which are all assembled within a lens housing 22 and lens cover or barrel 24 to move as a group along the optical axis.

The first and second lens groups 12,14 are maintained in alignment perpendicular to the film plane, are prevented from rotating, and are mounted for lengthwise movement along the optical axis by a plurality of parallel guide rods and anti-rotation shafts 26, 28, and 30. Main shaft 26 is secured to the camera body (not shown), and extends through a bushing 32 in housing 22 for aligning the first lens group 12 relative to the camera body and film plane (not shown). Shaft 28 extends from the second lens group 14 through an aperture in housing 22 and into a sleeve 34 in the first lens group 12 for maintaining proper alignment of the second lens group 14 relative to the first lens group 12. Shaft 30 extends from a boss 36 in the first lens group 12 through the housing 22 and against a notch 38 in the second lens group 14 to prevent rotation of the second lens group 14 relative to the first lens group 12. The end of the anti-rotation shaft adjacent retainer 18 is accommodated by a notch 40 in the retainer.

Longitudinal movement of the first lens group 12 along the optical axis X is provided through a drive shaft 42 under control of a motor 44. The drive shaft is coupled to housing 22 through a threaded nut 46 that translates rotary movement of the drive shaft into longitudinal movement of the housing and the first lens group assembled therewith. The second lens group 14, on the other hand, except for the control mechanism described hereinafter, is moveable independently of the first lens group along shafts 28 and 30.

The focus adjustment and focal length selection for the optical system are varied by a control device 48 which extends between and is coupled to the first and second lens groups 12 and 14. The control device includes a cam and cam follower mechanism 50 and 52, respectively, for changing the focal length of the optical system by communicating relative axial displacement to the second lens group in response to axial movement of the first lens group. The cam and follower mechanism includes a plurality of cam steps depicted at 54, and 56, each having a dwell cam surface 58 extending parallel to the optical axis, and a ramped cam surface 60, extending at an angle to the optical axis. In the embodiment shown, there are five dwell cam surfaces allowing focal lengths of 26, 32.7, 38.2, 43.4 and 48.0 millimeters. Each dwell cam surface accommodates axial movement of the first lens group without changing the relative displacement between the lens groups and thereby permits focusing of the optical system between at least two focus positions at a fixed focal length. The ramped cam surface displaces the second lens group relative to the first lens group in response to movement of the first lens group along the optical axis, and thereby changes the focal length of the optical system.

The cam and follower mechanism also includes a second plurality of cam steps 62 and 64 that are essentially mirror images of the steps 54 and 56 to define opposed pairs of cam steps, where each pair includes dwell cam surfaces that extend parallel to each other and to the optical axis, and ramped cam surfaces that extend at an angle relative to each other and the optical axis.

Referring now in more detail to the elements that make up the cam and follower mechanism, the cam follower 52 includes first and second linkages in the form of L-shaped members 66 and 68. The first L-shaped member 66 includes one end pivotally coupled to the front lens group 12 through a pin 70, and another end having a cam follower in the form of a pin 72. The second L-shaped member 68 has one end coupled to the second lens group 14 through a pin 74 and slot 76 (FIG. 4), permitting translational movement there between. Another end of second L-shaped member 68 includes a cam follower in the form of a pin 78. The first and second L-shaped members form a scissors linkage coupled in their center sections by a floating pivot 80.

The cam followers 72 and 78 are urged under the influence of spring 82 (FIG. 3) into engagement with the opposed cam surfaces of cam 50 for controlling a number of important optical functions. These functions will be described in connection with the operation of the cam and follower mechanism which follows.

The focal length is set first by selective operation of motor 44 to rotate drive shaft 42, operating through nut 46, to translate the rotary motion of the drive shaft into movement of the first lens group along optical axis X. During this initial travel of the first lens group, the first and second cam followers 72 and 78 are ramped apart by divergent cam surfaces that are angled away from each other and relative to the optical axis. This ramping movement spreads the cam followers and pivots the scissors linkage 66 and 68 apart, thereby displacing the second lens group relative to the first lens group. Both groups move along the same axis, but by a different amount, thereby changing the focal length. After selection of a discrete focal length, the focus can then be adjusted using the very same motor, drive shaft and mechanism to shift the first lens group so cam followers 72 and 78 transverse the cam sections that are parallel to each other and the optical axis. Such movement does not change the separating of the cam followers or the relative displacement between the first and second lens groups and, therefor, does not change the focal length of the optical system. It does, however, change its focus, permitting two or more focus settings for each discrete focal length.

Figure 5:
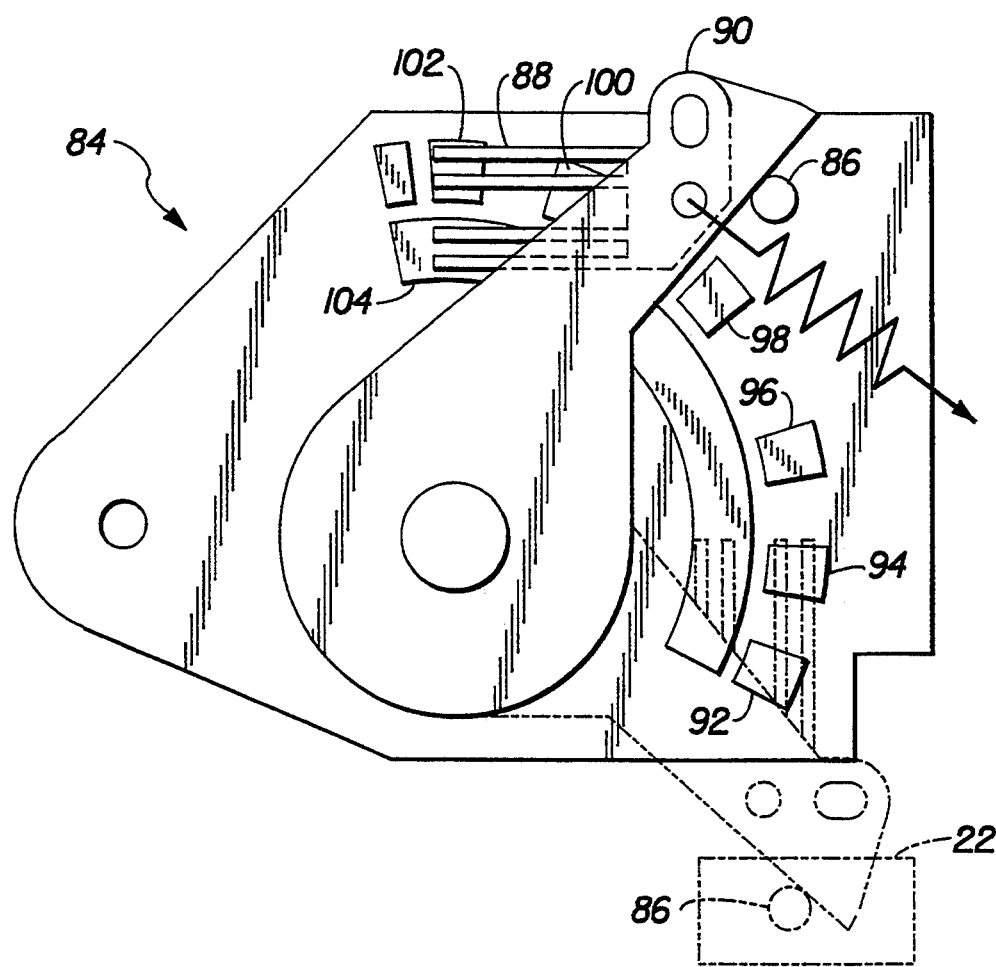
FIG. 5 is a bottom plan view of a switch control assembly for use with the zoom lens system of FIG. 3.

Referring now to FIG. 5, a switch control assembly 84 is depicted for use with the zoom lens 10 to sense and control the relative position of the first lens group 12 as it moves between a wide-angle position, depicted in solid lines in FIG. 5, and a telephoto position, depicted in phantom in FIG. 5. A pin 86, carried by housing 22 moves with the first lens group 12 during changes in its position along optical axis X. During such movement the pin engages and sweeps contacts 88, on pivotal arm 90, across a plurality of switch pads 92, 94, 96, 98, 100, and 102, for establishing electrical connections between such switch pads and a grounding strip 104. Each switch pad represents a desired position along the optical axis of the first lens group and cooperates with appropriate electrical mechanisms in the camera body (not shown) and motor 44 to establish the first lens group in each desired position. The dimensions of the respective pads also can be chosen in cooperation with the dwell and ramp surfaces 58 and 60 of the cam and follower mechanism 48 and 50 to facilitate the operation already described.

The above-described embodiment can be used with a simple switch (not shown) for setting close-up and distance focus settings. When in the close-up setting, the apparatus will drive the first lens group to a position at each discrete focal length that is suitable for close-up pictures. When in the distance setting, on the other hand, the apparatus will drive the first lens group to a different position, at each discrete focal length, that is suitable for distance pictures. An auto-focus device can be substituted for the manual switch to employ the same cam and follower mechanism to focus the camera. The focal length is selected first, and then the auto-focus device can be actuated to use the dwell cam surface to change focus without altering the focal length.

Figure 6:
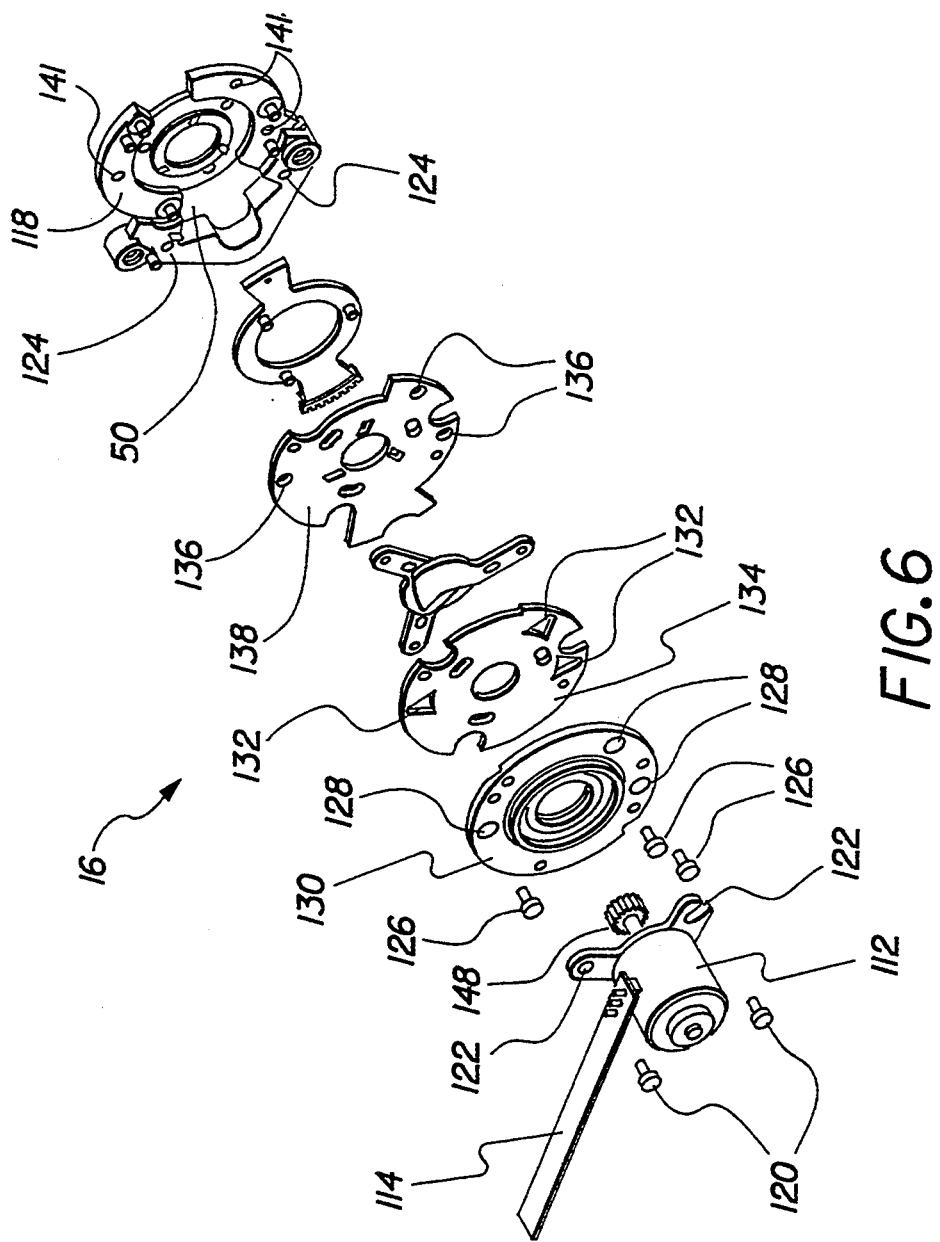
FIG. 6 is an exploded perspective view of the aperture/shutter mechanism of FIG. 3.
Figure 7:
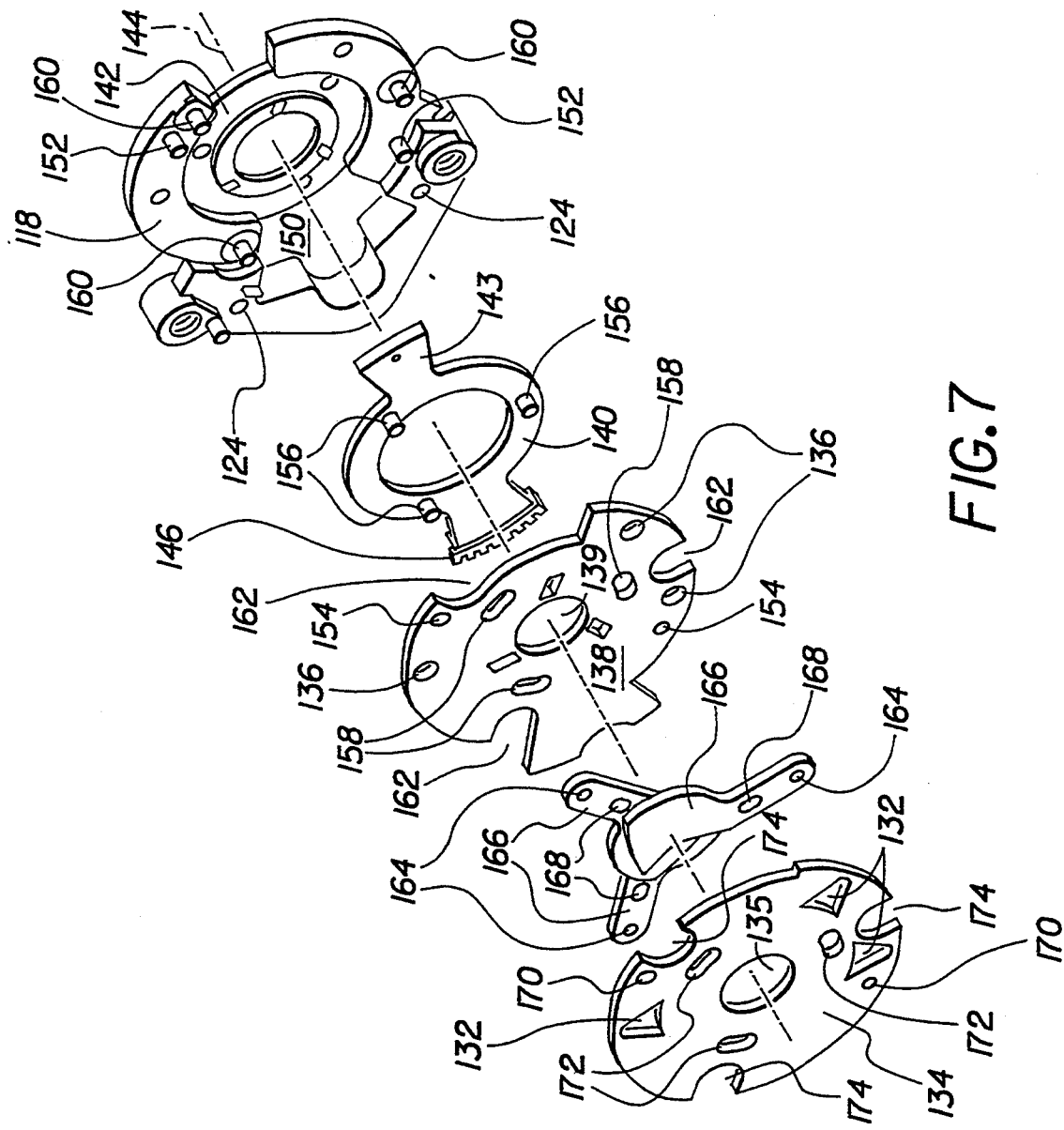
FIG. 7 is a perspective view of a portion of FIG. 6.

Turning now to FIGS. 6 and 7, diaphragm/shutter mechanism 16 includes a stepper motor 112 which is secured to a base plate 118 by a pair of self-tapping screws 120. Screws 120 pass through a pair of flange holes 122 on the stepper motor and engage a pair of holes 124, in base plate 118, which are adapted to receive screws 120. The remainder of the diaphragm/shutter mechanism is held together by three self-tapping screws 126 which pass through three holes 128 in a cover plate 130. Screws 126 next pass through three triangular shaped openings 132 in a first damping member 134 and three circular holes 136 in a second damping member 138. Finally, screws 126 engage holes 141 in base plate 118 to secure the entire assembly together.

A shutter blade actuator 140 resides in a circular recess 142 formed in base plate 118. As such, the only degree of freedom actuator 140 has is to rotate about an optical axis 144. Actuator 140 is preferably made of plastic. A gear rack 146 on actuator 140 is engaged by a gear 148 driven by stepper motor 112. It is preferred that gear rack 146 and gear 148 are resiliently pressed together in order to reduce system vibration. Gear 148 extends through an opening 150 in base plate 118 to engage gear rack 146. When stepper motor 112 rotates gear 148, actuator 140 is rotated about optical axis 144. An extension 143 of actuator 140 acts as a counter-balance to gear rack 146.

Second damping member 138 overlies actuator 140. A pair of pins 152 on base plate 118 protrude through a pair of holes 154 in second damping member 138 to properly position the second damping member and prevent it from rotating about the optical axis. Three driver pins 156 on actuator 140 extend through three elongated slots 158 in second damping member 138. When actuator 140 is rotated, driver pins 156 move within slots 158 without rotating the second damping member.

Three pivot pins 160 on base plate 118 protrude through openings 162 in second damping member 138. Pivot pins 160 pass respectively through three holes 164 respectively located in each of three shutter blades 166. Shutter blades 166 are free to pivot about pins 160. Driver pins 156 protrude respectively through three slots 168 located respectively in each of the shutter blades 166. Slots 168 are oriented such that when stepper motor 112 rotates actuator 140 about optical axis 144, driver pins interact with slots 168 to pivot shutter blades 166 about pivot pins 160.

The shutter blades act as both a shutter and a variable aperture diaphragm, and are adjustable to provide a relatively large aperture for effecting a relatively shallow depth of field of the taking lens and several smaller apertures for effecting less shallow depths of field of the taking lens. The shutter blades control the amount of light that reaches the film. In the present embodiment, the available apertures defined by the shutter blades are 5.7, 9.1, 13.2, and 16.3 mm$^2$.

First damping member 134 has a pair of holes 170 through which pins 152 protrude. Pins 152 prevent the first damping member from rotating about the optical axis. Driver pins 156 protrude respectively through three slots 172 in first damping member 134. Slots 172 allow driver pins 156 to rotate about optical axis 144 without rotating first damping member 134. Pivot pins 160 on base plate 118 extend respectively through three openings 174 located about the periphery of first damping member 134.

Damping members 134 and 138 each have an aperture, respectively designated 135 and 139, aligned with optical axis 144 and various sized apertures formed by shutter blades 166 when the shutter blades are in various open positions. As such, apertures 135 and 139 allow light to pass towards a photosensitive medium. Aperture 135 is slightly larger than aperture 139.

As an alternative to having the shutter blades define the largest opening, aperture 139 can be used to define the largest opening through which light can pass towards a photosensitive medium. Of course, aperture 135 could alternatively be used to define the largest opening instead of aperture 139. This is accomplished by opening the shutter blades wider than aperture 135 or 139.

Shutter blades 166 and first and second damping members 134, 138 are preferably (1) made of polyethylene terepthalate which is opaque and (2) flat. The damping members preferably have a substantially uniform thickness of 0.08 millimeters. When the diaphragm/shutter mechanism is assembled, shutter blades 166 are sandwiched between the first and second damping members. The first and second damping members each have a damping surface in constant frictional contact with at least a portion of each of the shutter blades. The frictional contact substantially prevents oscillation of the shutter blades throughout their entire range of movement and, most importantly, when the shutter blades are stopped at various aperture positions. As a result, more accurate exposures are obtained. By varying the thickness of the damping members and the size of the damping surfaces, the amount of damping can be fine tuned.

Figure 8:
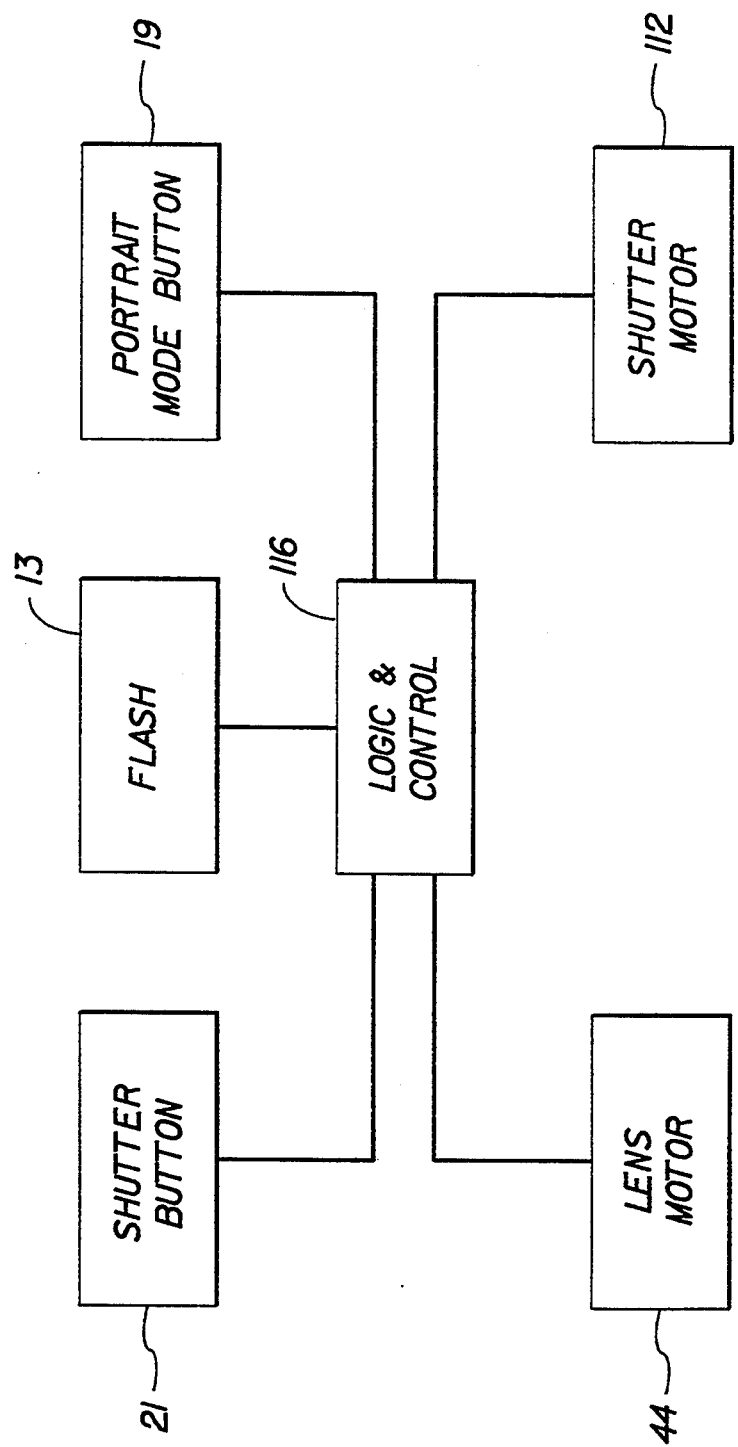
FIG. 8 is a schematic representation of the interface between the camera logic and control, and other components of the camera.
Figure 9:
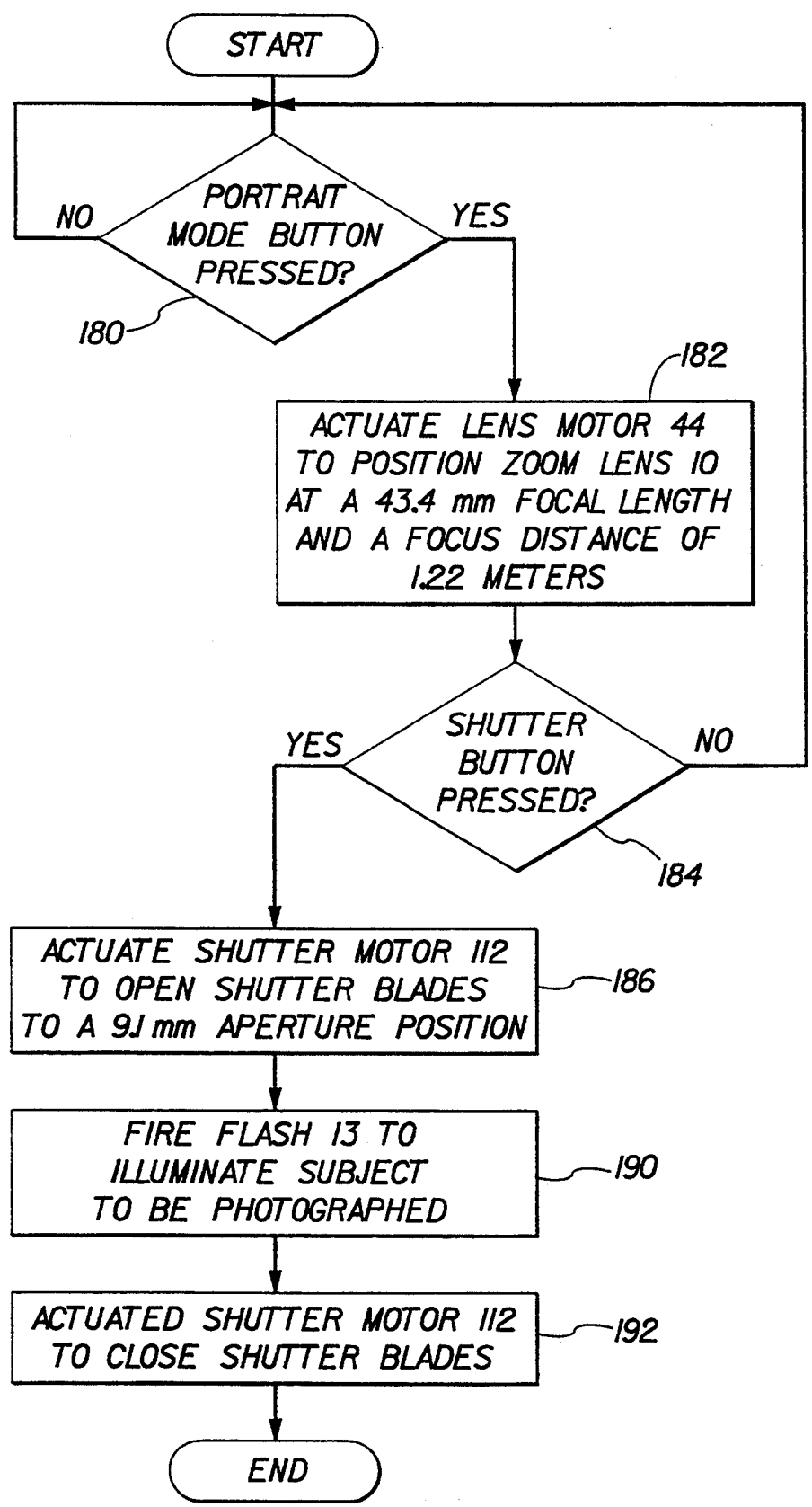
FIG. 9 is a flow diagram representing how the logic and control operates the camera when in the portrait mode.

Turning now to FIGS. 8 and 9, a camera logic and control 116 interfaces with portrait mode button 19, shutter button 21, lens motor 44 and shutter motor 112. When the cobra flash is opened, logic and control 116 enters a logic flow represented in FIG. 9. At a step 180, logic and control determines whether or not portrait mode button 19 has been pressed by a camera operator. If the portrait mode button has been pressed, logic and control 116, at a step 182, actuates lens motor 44 to position zoom lens 10 to a longer focal length of preferably 43.4 millimeters. Preferably, the same longer focal length is utilized every time portrait mode is selected. Lens motor 44 is then operated to position zoom lens 10 to a focus distance of 1.22 meters. It is noted that in the present embodiment, when the camera is in a normal picture taking mode, only focus distances of 2.29 and 3.51 meters are available. Therefore, in the portrait mode, it is preferable that a shorter focus distance is utilized than is available when the camera is in a normal picture taking mode. Utilizing such a short focus distance when in the portrait mode allows extremely close up pictures of the person(s) being photographed.

At a step 184, logic and control 116 determines whether or not shutter button 21 has been pressed. If the shutter button has been pressed, logic and control 116, at a step 186, actuates shutter motor 112 to open the shutter blades to a 9.1 mm² aperture position. It is noted that, in the present embodiment, the 9.1 mm² aperture position is the second smallest aperture position. At a step 190, logic and control 116 causes flash 13 to be fired to illuminate the subject to be photographed. Flash 13 is preferably utilized every time a person is photographed in the portrait mode. Logic and control 116 then causes shutter motor 112 to close the shutter blades, thereby completing the exposure.

In the present embodiment of the invention, the portrait mode button is held down until the shutter button is actuated. Alternatively, a one touch portrait mode button could be used or a mode button, used to select a plurality of modes including portrait mode, could be utilized. Although a combined diaphragm/shutter has been described, the present invention can provide advantage in a camera having an adjustable diaphragm separate from the shutter.

It should be evident from the foregoing description that certain aspects of the invention are not limited to the particular details of the examples illustrated, and it is therefore contemplated that other modifications and applications will occur to those skilled in the art without departing from the invention. It is accordingly intended that the claims shall cover all such modifications and applications as do not depart from the true spirit and scope of the invention.

PARTS LIST FOR FIGS. 1-9

| | |
|---|---|
| X Optical Axis | 66, 68 L-Shaped Members |
| 10 Zoom Lens | 70, 72, 74 pins |
| 11 Camera | 76 Slot |
| 12 Front Lens Group | 78 Pin |
| 13 Cobra Flash | 80 Floating Pivot |
| 14 Back Lens Group | 82 Spring |
| 15, 17 Buttons | 84 Switch Control |
| 16 Aperture/Shutter Mechanism Assembly | 86 Pin |
| | 88 Contacts |
| 18 Front Lens Retainer | 90 Pivotal Arm |
| 19 Portrait Mode Button | 92, 94, 96, 98, 100, 102 Switch Pads |
| 20 Rear Lens Retainer | |
| 21 Shutter Release Button | 104 Grounding Strip |
| 22 Lens Housing | 110 Diaphragm/Shutter Mechanism |
| 24 Lens Cover | |
| 26 Main Shaft | 112 Stepper Motor |
| 28, 30 Shaft | 114 Flex Circuit |

-continued

PARTS LIST FOR FIGS. 1-9

| | |
|---|---|
| 32 Bushing | 118 Base Plate |
| 34 Sleeve | 120 Self-tapping Screws |
| 36 Boss | 122 Motor Flange Holes |
| 38, 40 Notch | 124 Holes |
| 42 Drive Shaft | 126 Self-tapping Screws |
| 44 Motor | 128 Holes |
| 46 Threaded Nut | 130 Cover Plate |
| 48 Control Device | 132 Triangular Shaped Openings |
| 50 Cam | |
| 52 Cam Follower | 134 First Damping member |
| 54, 56 Cam Steps | 135 Aperture |
| 58 Dwell Cam Surface | 136 Circular Holes |
| 60 Ramped Cam Surface | |
| 62, 64 Cam Steps | |

What is claimed is:

1. A camera comprising a taking lens, a variable aperture diaphragm adjustable to provide a relatively large aperture for effecting a relatively shallow depth of field of said taking lens and a smaller aperture for effecting a less shallow depth of field of the taking lens, and manually operated means for selecting a portrait mode when taking a picture of a person, is characterized by:
   means for adjusting said diaphragm to provide said smaller aperture every time said portrait mode is selected, whereby the less shallow depth of field of said taking lens is always used to take a picture of a person in the portrait mode.

2. The camera of claim 1, further characterized by:
   means for emitting light to illuminate said person, said light emitting means being operated to emit light every time a picture of a person is taken in the portrait mode.

3. The camera of claim 1, further characterized by:
   said taking lens including a zoom lens system moveable between a relatively short focal length and one or more longer focal lengths including a longest focal length and a next-to-longest focal length, said zoom lens system being moved to the next-to-longest focal length every time a picture of a person is taken in the portrait mode.

4. The camera of claim 1, further characterized by:
   said taking lens being moveable between a plurality of focus distances including a shortest focus distance, utilized only when a picture of a person is taken in the portrait mode, and one or more longer focus distances.

5. The camera of claim 1, wherein said diaphragm includes a shutter.

6. The camera of claim 1, wherein said diaphragm is adjustable to provide a plurality of relatively smaller apertures, said adjusting means adjusting said diaphragm to provide a same smaller aperture every time said portrait mode is selected.

7. The camera of claim 6, wherein said plurality of relatively smaller apertures includes a smallest aperture and a next-to-smallest aperture, said same smaller aperture being said next-to-smallest aperture.

* * * * *